United States Patent [19]

Schweitzer, Jr. et al.

[11] 3,869,329

[45] Mar. 4, 1975

[54] METHOD OF SEALING NYLON FILM USING BOILING WATER OR STEAM

[75] Inventors: Arthur J. Schweitzer, Jr., South Orange; Eugene Schupak, Dover, both of N.J.

[73] Assignee: Allied Chemical Corporation, New York, N.Y.

[22] Filed: June 23, 1971

[21] Appl. No.: 156,063

[52] U.S. Cl................. 156/308, 161/227, 161/411, 264/83
[51] Int. Cl. ...... C09j 5/02, B32b 31/12, B29d 9/00
[58] Field of Search................... 156/306, 307, 308; 161/227, 411, 150; 264/83

[56] References Cited
UNITED STATES PATENTS

| | | | |
|---|---|---|---|
| 3,322,593 | 5/1967 | Conti | 156/307 |
| 3,365,348 | 1/1968 | Conti | 156/308 |
| 3,607,544 | 9/1971 | Earner et al. | 156/307 |

OTHER PUBLICATIONS

Sherwood, "Nylons (Polyamides)", Modern Plastics Encyclopedia, Vol. 46, No. 10 A, (October 1969), pp. 154 and 159.

*Primary Examiner*—Charles E. Van Horn
*Assistant Examiner*—Robert A. Dawson
*Attorney, Agent, or Firm*—Patrick L. Henry; Jonathan Plaut

[57] ABSTRACT

A method for sealing nylon film without shrinkage or degradation of the film is provided which comprises exposing at least one surface of the film to boiling water or steam and thereafter contacting the exposed surface with another film surface whereby a seal is effected.

3 Claims, No Drawings

METHOD OF SEALING NYLON FILM USING BOILING WATER OR STEAM

This invention relates to a process of sealing nylon films.

When attempting to heat-seal or bond together through the agency of heat a thermoplastic film, the film often shrinks or retracts in the heated area, the resulting heat seal is usually puckered and/or opaque. Furthermore, the film may tear at the seal as it shrinks. Nylon films have conventionally been sealed by applying pressure and heat by pressing overlapping edges of the film with a heated sealing bar. Temperatures employed normally range from 175°C. to 275°C. with pressures of 30 to 50 psig. being applied with the result that the seal becomes weakened as the polymer softens and degradation of the film often occurs.

It is an object of this invention to provide a process for effectively sealing or bonding together nylon film without shrinkage in the seal area and without degradation of the film.

Other objects will be apparent from the detailed description of the invention which follows:

It has been discovered that nylon film may be bonded to itself or other nylon film by exposure of at least a portion of at least one surface of the film to steam or boiling water and thereafter contacting said exposed surface to at least one other nylon surface whereby a seal is effected. It has further been discovered that such bonds, when sealed by this method, are stronger than the tear strength of the film, there is no shrinkage in the seal area and the fear of degradation of the film is completely obviated.

Polyamide film prepared from film-forming polyamides and having a melting point above about 100C. may be effectively sealed by the invention process. Such polyamides include Nylon 6, which is especially preferred. In general this method of sealing can be applied to any unsupported nylon film for a variety of purposes, ie., to make bags from tubing for use as shock absorber bags, to effect seaming in the production of wide sheets of film, etc. Sealing can also be effected with nylon lined bags of low-melting materials, for example, polyethylene bags lined with Nylon 6.

Sealing of the film may be accomplished either by exposing the film or a portion thereof to boiling water as by immersion, and then contacting the thus exposed surface with a second surface of nylon film or by exposing one or more surfaces of film to steam and then placing said surfaces together. Preferably both surfaces are exposed to the boiling water or steam before contact. The application of pressure is not required to effect a seal. Surface contact of the layers of film is sufficient. Application of pressure may even exert an adverse effect, since it has been found that in those instances where the film was exposed to substantial heat and the pressure confined the films being sealed, such heat and confinement resulted in wrinkling of the films and the entrapment of water vapor bubbles therein.

The actual time of exposure to steam or boiling water does not have any appreciable effect since strong bonds have been obtained after exposure for as short a period as 1 minute or as long as 100 minutes without any appreciable difference in the nature of the bond.

Film thicknesses of the various surfaces are subject to variation. Satisfactory bonding has been realized employing film of about 0.5 mil to about 20 mil in thickness with thicknesses of about 0.5 mil to 3 mil being preferred.

The seal strength of the bond realized by the present process exceeds the tear strength of the film, e.g., the seal is strong enough to tear the film when attempting to separate the layers. Such high strength is retained even after all water has been removed by vacuum drying.

The exact reaction mechanism by which the excellent bonding is achieved is not known. While not wishing to be bound thereby, it is believed that at temperatures of about 100°C. in the presence of water or high relative humidity environment, the water plasticizes the films bringing about bonding on intimate contact thereof.

The following is an example of one method of practicing the invention.

EXAMPLES

A. Samples of films of polycaproamide available commercially as Capran 77C, a Nylon 6 film having a melting point of about 225° to 230°C., of 1/2 and 1 mil thicknesses, respectively, were immersed in boiling water for 1 minute, 10 minutes and 100 minutes each. Two strips of each sample were superimposed one on the other so that opposite faces were in contact. A seal was made across the width of the contacted surfaces immediately upon contact. Attempts were made to break the seal by pulling the layers apart by hand. The bond was found to be stronger than the tear strength of the film and such strength was retained even after vacuum drying to remove water from the bonded samples. No shrinkage was observed in the bond area.

B. When Precedure A was repeated except that the film samples were exposed to steam by holding the same over boiling water, the results were identical to those obtained in Procedure A.

We claim:

1. A method for sealing polycaproamide film surface which comprises exposing said surface to boiling water or steam only as the adhering solvent and thereafter contacting said exposed surface with at least one other polycaproamide film surface whereby a seal is effected between the contacted surfaces.

2. A method as claimed in claim 1, further comprising exposing both surfaces to boiling water or steam before contact.

3. A method as claimed in claim 1 wherein said polyamide film surfaces are Nylon 6.

* * * * *